United States Patent [19]

Walker

[11] Patent Number: 4,845,636

[45] Date of Patent: Jul. 4, 1989

[54] REMOTE TRANSACTION SYSTEM

[76] Inventor: Mark E. Walker, 1207 White Pine, San Antonio, Tex. 78232

[21] Appl. No.: 920,280

[22] Filed: Oct. 17, 1986

[51] Int. Cl.[4] .................. G06F 15/20; G06F 7/08; H04N 7/14

[52] U.S. Cl. .................. 364/479; 335/381; 358/85; 364/401; 379/53

[58] Field of Search .............. 364/479, 401, 408, 405, 364/407; 235/379, 381, 380, 382, 382.5; 358/85, 93; 379/53, 54

[56] References Cited

U.S. PATENT DOCUMENTS

| | | | |
|---|---|---|---|
| 2,099,115 | 11/1937 | Ives | 178/7.1 |
| 3,567,848 | 3/1971 | Thies et al. | 178/6 |
| 3,662,343 | 5/1972 | Goldstein et al. | 340/149 |
| 3,705,384 | 12/1972 | Wahlberg | 340/149 |
| 3,711,833 | 1/1973 | Starkey | 340/149 A |
| 3,718,906 | 2/1973 | Lightner | 340/147 R |
| 3,727,186 | 4/1973 | Stephenson, Jr. et al. | 340/149 A |
| 3,770,941 | 11/1973 | Gechele et al. | 235/61.7 R |
| 3,914,579 | 10/1975 | Shigemori et al. | 364/408 |
| 3,943,335 | 3/1976 | Kinker et al. | 235/381 |
| 3,949,364 | 4/1976 | Clark et al. | 340/825.31 |
| 4,173,024 | 10/1979 | Miller | 358/115 |
| 4,205,780 | 6/1980 | Burns et al. | 364/521 |
| 4,245,902 | 1/1981 | Cataldo et al. | 235/379 |
| 4,247,759 | 1/1981 | Yuris et al. | 235/381 |
| 4,258,387 | 3/1981 | Cemelson et al. | 358/85 |
| 4,359,631 | 11/1982 | Lockwood et al. | 235/381 |
| 4,360,827 | 11/1982 | Braun | 358/85 |
| 4,398,257 | 8/1983 | Paganini et al. | 364/550 |
| 4,400,724 | 8/1983 | Fields | 358/85 |
| 4,400,725 | 8/1983 | Tanigaki | 358/85 |
| 4,438,326 | 3/1984 | Uchida | 364/408 |
| 4,602,332 | 7/1986 | Hirose et al. | 364/408 |
| 4,617,457 | 10/1986 | Granzon et al. | 235/379 |

Primary Examiner—Joseph Ruggiero
Attorney, Agent, or Firm—Arnold, White & Durkee

[57] ABSTRACT

A remote transaction system is disclosed which may be used to conduct business transactions wherein visual contact between a buyer and a seller is desired or required. A transaction booth is located remotely from an operations center, the booth and the center being connected by audio and video communication lines. The booth includes audio and video equipment for transmitting and receiving audio and video signals between the booth and the center. Decoders are provided in the booth to receive telephone touch tones or pulses from the operations center and to control the audio and video equipment and other equipment in the booth. Alternatively, a programmable device, such as a controller or microcomputer, generates control signals for controlling the equipment. A dispenser unit is controllable from the operations center utilizing a decoder to selectively dispense items or objects to a customer. A payment module facilitates payment for items or services by cash, credit card, or other appropriate means. The various equipment included in the booth is assembled into modules which can be simply and easily installed in the booth and interconnected using a wiring harness, facilitating the assembly and maintenance of the system.

8 Claims, 4 Drawing Sheets

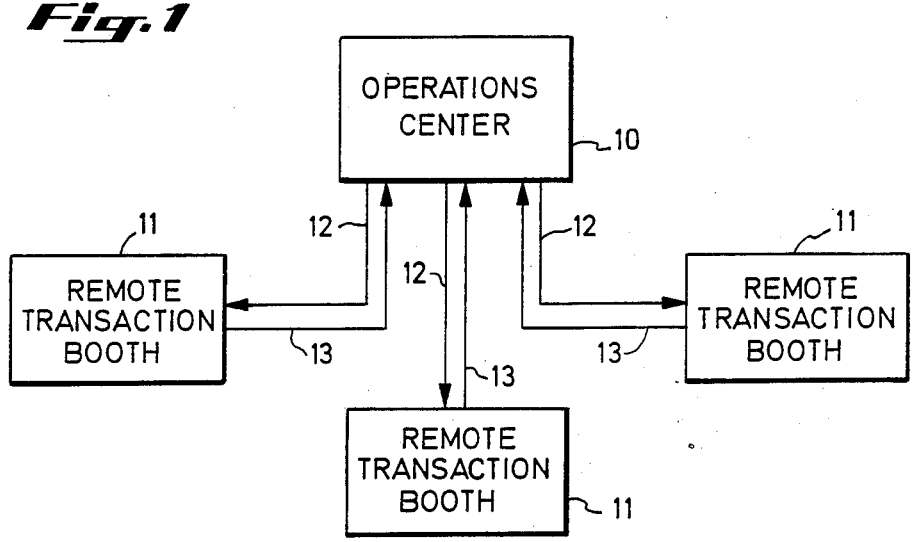
Fig. 1
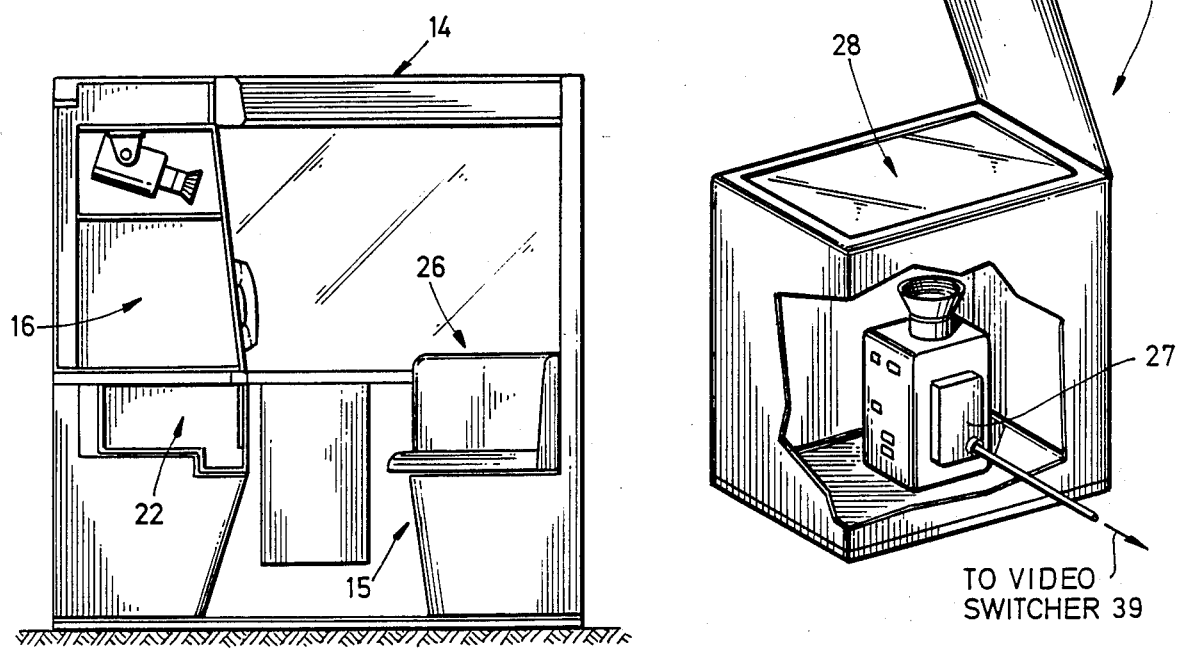
Fig. 2
Fig. 3

REMOTE TRANSACTION SYSTEM

FIELD OF THE INVENTION

The present invention relates generally to a system for conducting business transactions between a seller and a buyer where the seller and buyer are at locations remote from one another. More particularly, the present invention relates to a system wherein the seller visually observes the buyer during the course of the transaction.

BACKGROUND OF THE INVENTION

Over the past several years, a trend has developed in which more and more business transactions are conducted not at central business centers but rather at remotely located machines or stations. An example of this trend has been the increasing popularity of automated teller machines (ATMs) which allow a person to conduct his banking activities at times and places more convenient for him than the hours and locations of the banking centers.

This trend toward remote business transactions has been spurred by the use of computers and computer-related equipment. This equipment has provided the capability of operating remote machines or stations beyond normal business hours. To date, however, the vast majority of remote transactions involve the user of the services and a computer controlling the system, and do not involve "face-to-face" transactions.

There has been an increasing need for businesses to be able to expand into new and remote markets. Because of the nature of many businesses, however, such expansion has been accompanied by high overhead expense. This is because many business transactions require a face-to-face communication between a buyer and a seller. For example, a rental car business must be able to observe a potential user in order to assess the apparent capability of the user to operate the automobile.

SUMMARY OF THE INVENTION

A remote transaction system according to the present invention generally includes a transaction booth which is located at a point remote from a central operations center. Communication lines extend between the operations center and the booth and interconnect audio and video communications equipment located at both the operations center and the booth. A decoder is located in the booth and is adapted to receive signals transmitted from the operations center and to control the audio and video equipment located in the booth in response to the signals. A programmable device such as a microcomputer may be used in place of the decoder and may be arranged to receive signals from the operations center and, in turn, control the equipment in the booth or may be programmed to control the equipment according to predetermined instructions. A payment means is provided wherein the user of the booth can pay for services or products using cash or a credit card. A dispenser is connected to the decoder or programmable device and, upon instruction from the operations center, dispenses items to the user. The booth provides a setting in which the user can sit or stand during the course of the transaction and be positioned with respect to the video equipment so as to have his image transmitted to the operations center for viewing by an operator. Additionally, the booth may have a video display unit for displaying images to the user at the discretion of the operator at the operations center.

BRIEF DESCRIPTION OF THE DRAWINGS

FIG. 1 is a block diagram illustrating a central operations center and remote transaction booths connected thereto FIG. 2 shows a booth according to the present invention with its various major components.

FIG. 3 illustrates a verification module as utilized in the remote booth.

DETAILED DESCRIPTION OF A PREFERRED EMBODIMENT

Figure 4A:
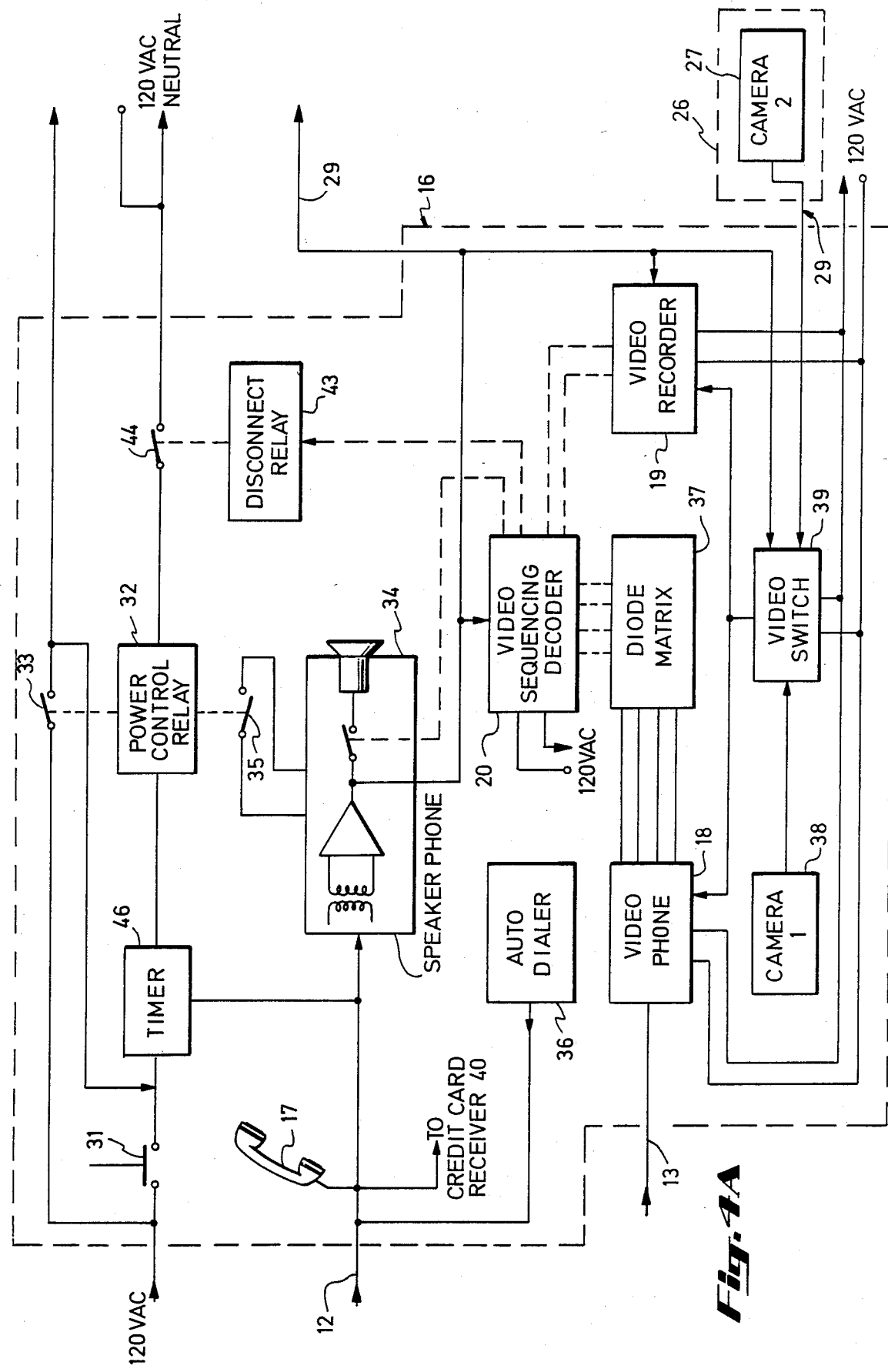
FIGS. 4A and 4B are a diagrammatic representation of the equipment used in the booth and the interconnections between the equipment.

Referring to FIG. 1, a remote business transaction system generally comprises an operations center 10 and a plurality of remote transaction booths 11 operatively connected to the operations center 10 by means of audio communication lines 12 and video communication lines 13. An operator at the operations center 10 can communicate with any or all of the remote booths 11 and can visually observe people conducting business transactions in the various booths 11. Preferably, both audio and video communication lines, 12 and 13 respectively, will interconnect each of the various remote booths 11 with the operations center 10.

Referring now to FIG. 2, a remote transaction booth 11 according to the present invention generally comprises a housing 14 having a seating area 15 in which a person can enter to conduct a transaction. For purposes of this description, it will be assumed the person desires to rent or lease an automobile.

Located opposite the seating area 15 and facing the seating area 15 is a communication module 16. The communication module 16 contains various equipment, including a telephone-type device, a video phone, a recorder and a decoder (not shown in FIG. 2). A microcomputer or other programmable device may be included in the communication module 16. A payment submodule (not shown) may also be included in the communication module 16.

Located immediately below the communication module 16 is a dispenser module 22. The dispenser module 22 contains a plurality of storage bins in which individual items or objects to be dispensed to a user may be stored. A second decoder or programmable device is located in the dispenser module 22 and is used for selectively controlling the individual dispensing bins. A security lock mechanism prevents inadvertent dispensing of items from the bins.

Located adjacent the seating area 15 is a verification module or camera box 26. As shown in FIG. 3, the verification module 26 includes a camera 27 for focusing on a holder plate 28. The holder plate 28 is designed to receive an identification card or other identification means for photographing by the camera 27. As used in one embodiment, the plate 28 is of a substantially transparent material to facilitate the camera 27 capturing an image of a card or document placed on the holder.

In the various modules, the equipment is preferably wired to terminal blocks or plugs for connection to a wiring harness (not shown). The wiring harness interconnects the three modules with one another and with the external audio and video communication lines 12 and 13. This modular arrangement simplifies the process of constructing and maintaining the remote transaction booth.

Figure 4B:
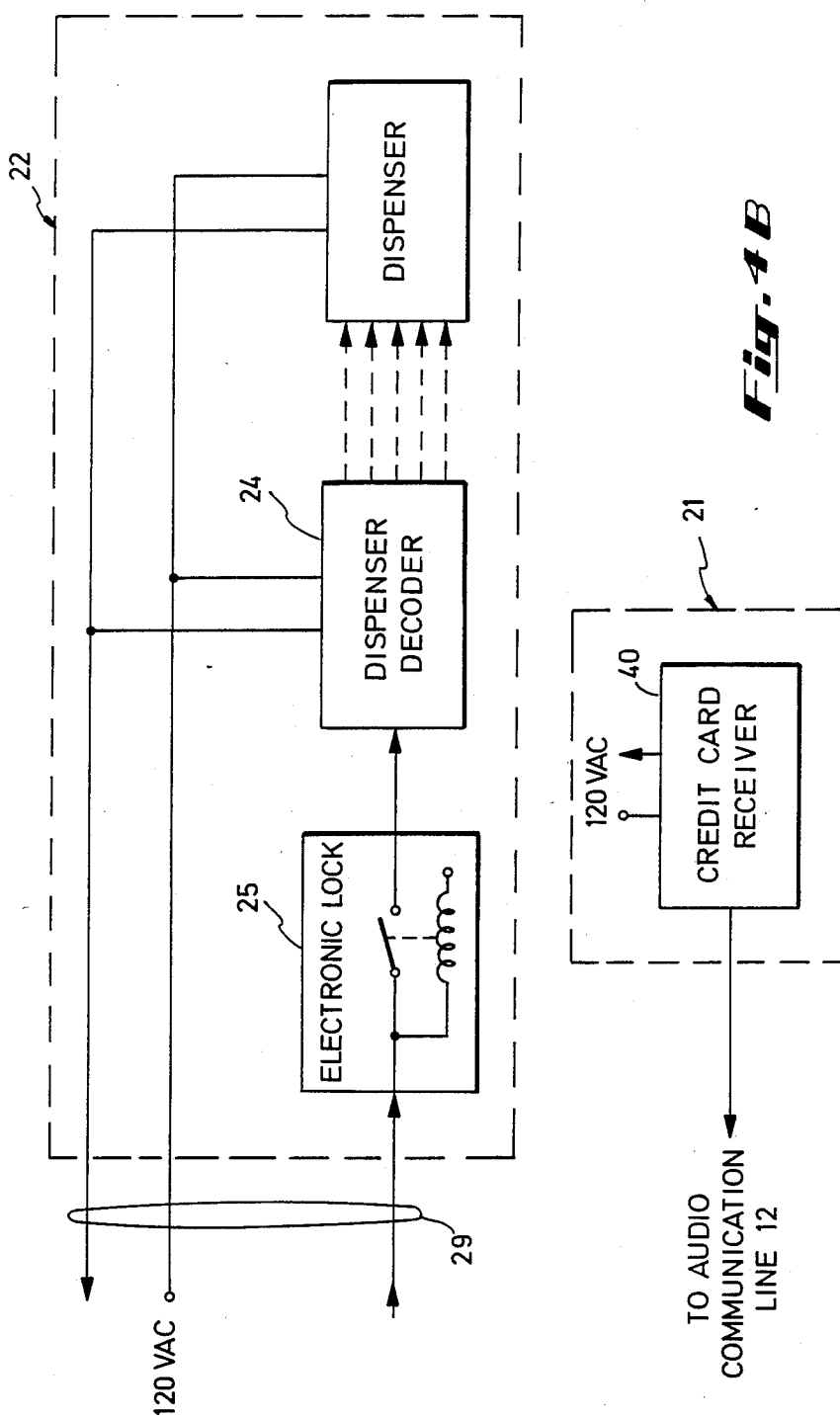

FIGS. 4A and 4B are a diagrammatic representation of the equipment included in the remote transaction booth and the connections between that equipment. A momentary push-button switch 31 actuates a latching control relay 32 having contacts 33 which are used to energize all equipment in the booth with 120 volts AC power. Once the control relay 32 is actuated, it will latch on through contact 33.

The telephone includes a handset 17 and speaker phone 34 and is connected to an external communication line 12 to provide audio communication between the remote booth 11 and the operations center 10. The external communication line 12 may be a conventional telephone line 12. A contact 35 in the control relay 32 activates the speaker phone's "CALL" button to initiate the off-hook condition. This technique is well known in the art and will not be discussed further.

Equipment located at the telephone company's central office acknowledges the off-hook condition with return of a dial tone. Upon receipt of the dial tone, an automatic dialer 36 commences dialing of a preprogrammed phone number to the operations center. Satisfactory results for an auto-dialer 36 used in one embodiment of the invention were achieved with a model HOT SHOT INSTANT ACCESS DIALER made by Zoom Telephonic, Inc., and its operation with respect to detection of a dial tone and automatic commencement of dialing of a preprogrammed number are standard for that model.

The speaker phone 34 may be utilized for audio communication between a user in the booth and an operator at the remote operations center. Alternatively, an ordinary telephone handset 17 may be added so that audio signals transmitted to the remote center will not be unduly burdened by noise in the immediate vicinity of the booth. In one embodiment, the handset 17 has shown distinct advantages to the use of the speaker phone 34 alone.

In a preferred embodiment, a timer circuit 46 is included in the control relay latch-in circuit 32. A timer device 46 may be set for 60-second time out and the timer 46 will be reset each time a tone or pulse is detected on the audio communication line 12. If no tone or pulse signal is detected on the audio line 12 for a continuous 60-second period, the control relay 32 will be caused to drop out, removing 120 VAC power from all equipment in the booth 11 and, thus, terminating the connection of the booth 11 with the operations center 10. The use of such a timing device 46 is advantageous in the case where the initiating phone call from the booth 11 to the operations center 10 results in a "busy" signal or no answer at the operations center 10. If the telephone number is busy or there is no answer, the booth 11 will automatically be shut down after 60 seconds and the system will be reset to initiate another transaction.

The video equipment includes a video phone 18 which is connected with external communication lines 13. The video equipment transmits a video image of a person in the booth 11 to the operator at the operations center 10 and, conversely, transmits a video image from the operations center 10 to the booth 11. A video phone 18 known as the PHOTOPHONE, made by Image Data Corporation of San Antonio, Texas, has in practice proven to be suitable for use as a video phone 18 in the present invention. The PHOTOPHONE uses ordinary telephone lines to transmit and receive "slow scan", or "still", pictures. Technical specifications for the PHOTOPHONE are included in a brochure dated June, 1986 and distributed by Image Data Corporation, 7986 Mainland Drive, San Antonio, Texas 78250 (Box 380349, San Antonio, Texas 78280-9997), the disclosure of which is hereby incorporated by reference.

Figure 5:
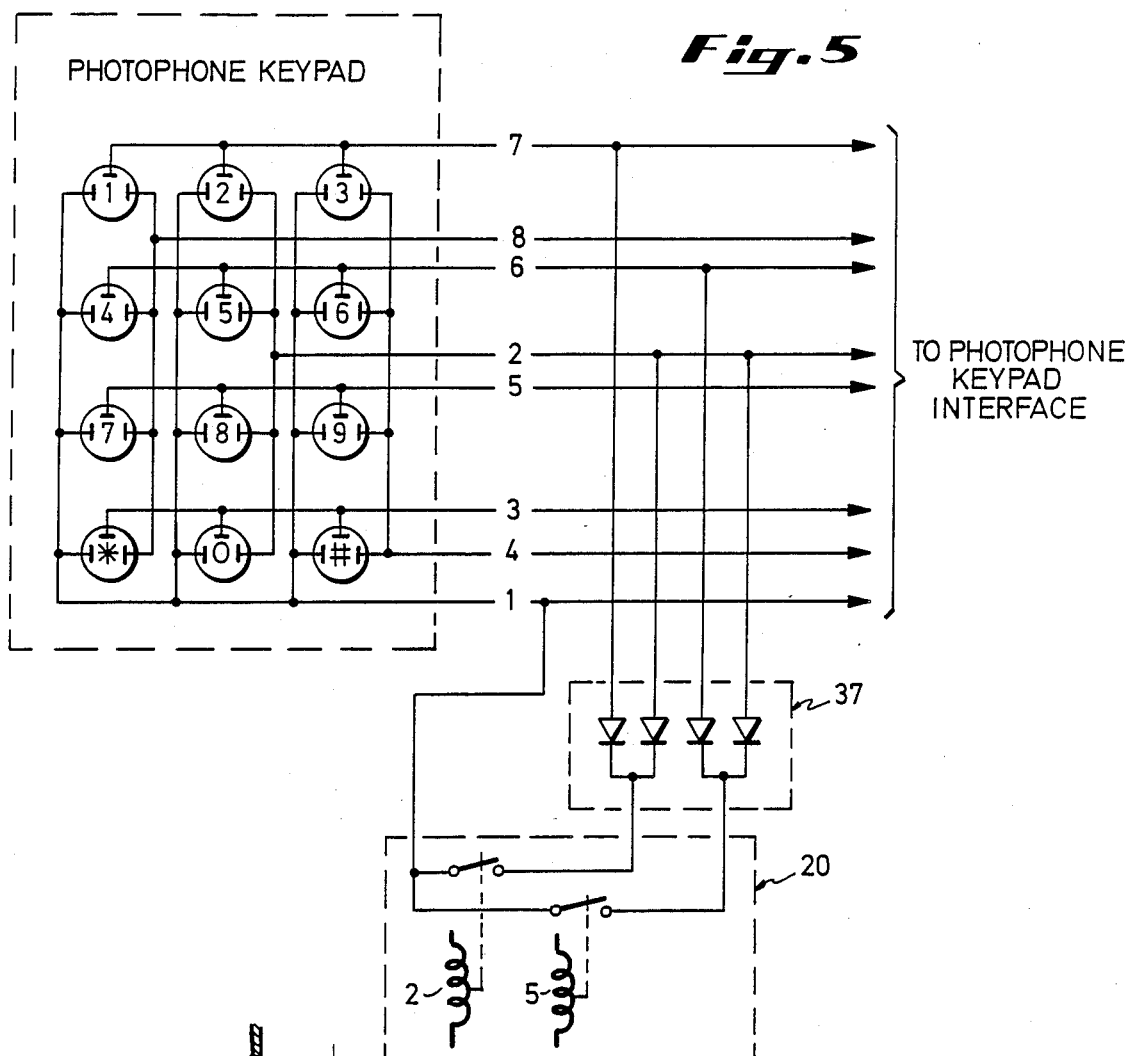
FIG. 5 is a schematic of the diode matrix used in conjunction with video equipment in the booth.

A typical conventional video phone 18 is normally controlled by a keypad (shown in FIG. 5) accessible by a person in the booth 11. In the present embodiment, a diode matrix 37 has been added to the video phone 18 and is electrically parallel to the keypad. This diode matrix 37, as shown in FIG. 5, provides for control of the video phone 18 when used in conjunction with the decoder 20 which will be more fully described below. In normal operation of the system in accordance with the invention, the touch pad on the video phone 18 is not used.

Two cameras, 38 and 27, and a video switcher 39 are utilized in conjunction with the video phone 18 to provide alternative video images to the video phone 18 for transmission to the operations center 10. RCA type TC2012 cameras have been used in practice with satisfactory results. A first camera 38 is positioned in the communication module 16 or otherwise conveniently in the booth 11 to capture the image of a person sitting or standing in the booth 11. A second camera 27 is positioned in the verification module 26, as was shown in FIG. 3 and discussed above, to capture the image of identifying documentation.

The video switcher 39 is controlled remotely from the operations center 10 directly through the audio line 12 to selectively direct output from the first or second camera, 38 or 27, to the video phone 18 for transmission to the operations center 10, as will be discussed below. The video switcher 39 has its output connected to the video phone 18 and has separate inputs connected to the first camera 38 in the communication module 16 and the second camera or video device 27 in the verification module.

A Teletronix model VS100 camera switcher has been used in one embodiment of the present invention, although similar devices may be utilized. The model VS100 accepts control input from audio line 12 in the form of industry standard DTMF (Touch-Tone) signals, providing connection between one of several inputs and the output terminals. The Teletronix Model VS100 video switcher is described in a brochure distributed by Teletronix Systems Incorporated, 3255 Kerner Blvd., Suite 6, San Rafael, California 94901, the disclosure of which is hereby incorporated by reference.

A recorder 19 is adapted to receive input from the audio line 12 and the video switcher 39. An RCA Time Lapse Video Recorder, having a date/time mask feature, may be used to make a recording of the audio and video portions of a transaction occurring within the booth 11 by recording the audio and video signals. The recorder 19 is also provided with an electronic control feature which allows the recorder 19 to be controlled from a remote location as will be more fully discussed below. This electronic control feature is standard on the RCA Time Lapse Video Recorder.

A first or video sequencing decoder 20 has an input connected to the audio communication line 12 and is designed to receive control signals in the form of telephone touch tones or pulses, or combinations of tones or pulses, and to generate control signals or instructions in response thereto. Alternatively, the decoder 20 may be adapted to receive telephone touch tones or pulses and, in response thereto, complete electrical circuits by closing contacts. The decoder 20 used in one embodiment of the present invention is a Model UC100, manufactured by Teletronix of San Rafael, California, and has several output circuits which may be selectively activated in response to appropriate input signals. Individual relaytype devices in the decoder respond to tone inputs to close selected electrical contacts. The Teletronix Model VC100 is described in a brochure distributed by Teletronix Systems Incorporated, 3255 Kerner Blvd., Suite 6, San Rafael, California 94901, the disclosure of which is hereby incorporated by reference.

As shown in FIG. 5, certain of the output circuits of the video sequencing decoder 20 are electrically connected to the diode matrix 37 controlling the video phone 18. The actuation of selected relays in the decoder 20 results in closure of the corresponding contacts which simulates the operation of keys on the video phone keypad (by creating Touch-Tone signals). The decoder and diode matrix provide a means for controlling the video phone 18 from the operations center 10 by transmitting appropriate touch tones or pulses along the audio communication line 12. Only keys "2" and "5" are shown. Other keys necessary for the remote operation of the video phone may be similarly connected. Video phone functions such as receiving images, transmitting images and disconnecting may be controlled from the operations center 10 by means of the audio communication line 12, the first decoder 20 and the diode matrix 37.

Other output circuits of the video sequencing decoder 20 are utilized for connection to the electronic control mechanism of the security recorder 19. These ties allow for control of the recorder 19 by an operator at the operations center 10. As in the case of controlling the video phone 18, the decoder 20 is designed to receive standard telephone touch tones or pulses and complete individual electrical control circuits for controlling the recorder 19 in response to those tones or pulses. Recorder functions which may be controlled through the video sequencing decoder 20 include, for example, record, stop, rewind, and others.

Although the described embodiment utilizes the decoder 20 to receive Touch-Tone signals and control the booth equipment, a programmable device, such as a controller or microcomputer, could be used with equal success. A programmable device may be adapted to receive instructions via the audio line 12 and generate control signals for controlling the audio and video equipment. Appropriate interface equipment (e.g., modem) may be required. Alternatively, the device may be programmed to respond to input according to predetermined instructions to control the equipment.

A payment submodule 21 is housed in the transaction booth 11 and includes a credit card receiver 40 for receiving and reading the data from a credit card. The payment submodule 21 may be included in the communication module 16 or may be a separate module. As is commonly known, data is encoded on a magnetic strip of a credit card, the magnetic strip being readable by the credit card receiver 40. An ATM-type card reader may be utilized and may include a keypad for the use of bank cards requiring the input of a personal identification number to activate the card. One credit card reader which may be utilized with the present invention is manufactured by OMRON, and is distributed by Mitsubishi. Other ATM-type transaction terminals may also be utilized as payment submodules 21.

Credit information extracted from the credit card is transferred or transmitted to the operations center 10 via the audio line 12 for evaluation by the operator. It may then be transmitted to a credit card processing center for approval, according to well-known principles. The information may also be utilized for payment of goods or services involved in the business transaction.

In an alternative embodiment, means may be provided for accepting cash for payment of goods or services. Apparatus for such an arrangement is well known to those skilled in the art and will not be described at length. When used with the present invention, a cash receiver will generate a signal which is transmitted to the operator at the operations center 10 via the audio communication line 12 indicating receipt of payment. The operator will then activate the dispenser 22 to dispense the selected item.

A dispenser module 22 is located in the booth 11 and houses the mechanism for dispensing items or objects to a person in the booth 11 in response to control signals received from the operations center 10. The dispenser 22 includes a plurality of bins 23, illustrated in FIG. 6, for storing the items to be selectively dispensed to a user of the booth 11. In one embodiment of the present invention, the items to be dispensed are automobile keys where the booth 11 is used in conjunction with car rental services. A second decoder or dispenser decoder 24, similar to the video sequencing decoder 20, has its input connected to the audio communication line 12 extending between the operations center 10 and the remote booth 11. In response to standard telephone touch tone or pulses, the dispenser decoder 24 generates control signals or instructions for individually controlling the bins 23 to selectively dispense the automobile keys or other items. Alternatively, the decoder 24 may complete individual dispenser control circuits in response to the touch tones.

As in the case of the decoder 20, the decoder 24 may be replaced by a programmable device for control of the dispenser module 22. The programmable device may be adapted to receive Touch-Tone signals and to generate control signals in response thereto or may be adapted to generate control signals according to a predetermined set of instructions such as a program.

Figure 6:
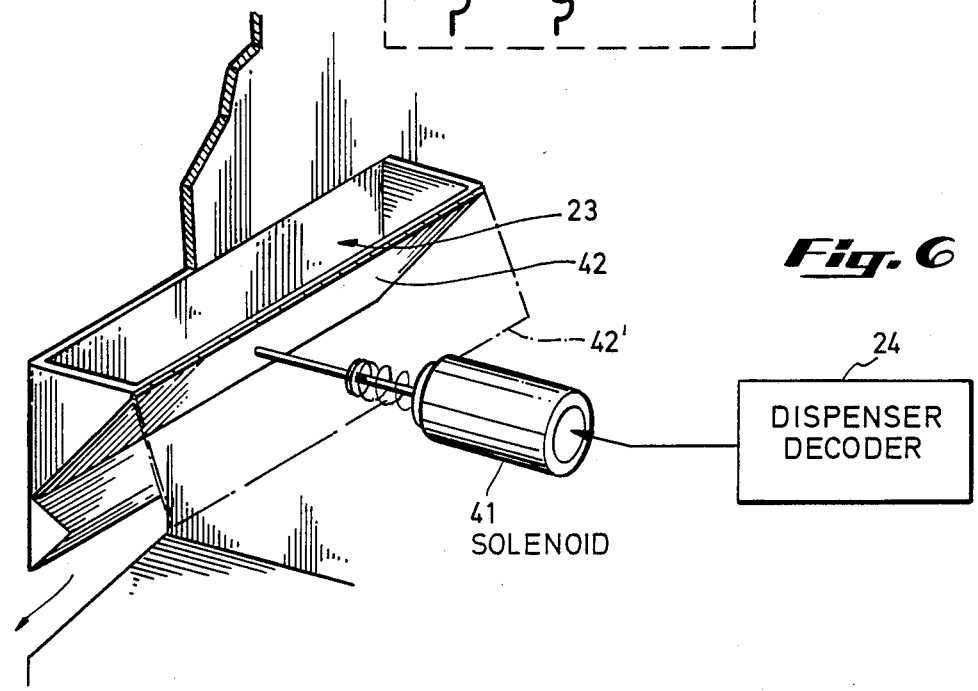
FIG. 6 shows a storage bin used in the dispenser module of a booth of the present invention.

While various dispenser mechanisms may be utilized, FIG. 6 illustrates a typical storage bin 23 as utilized in one embodiment of the present invention. A solenoid 41 is actuated by a signal received from the dispenser decoder 24 and operates a hinged panel 42 to open the bin 23 (as shown in its dotted position in FIG. 6) and allow the item contained therein to drop to a tray which is accessible by a person in the booth 11. The outputs to the individual dispenser solenoids 41 from the dispenser decoder 24 are latched outputs and a dispenser solenoid 41 will remain actuated and the associated bin 23 will remain open until the remote transaction booth 11 is shut down and 120 volt AC power is removed from the equipment. At that time, the spring-loaded solenoids 41 will return to a position in which the dispenser bins 23 are closed.

To prevent inadvertent dispensing of items, an electronic lock 25 is connected between the external audio communication line 12 and the input of the second or dispenser decoder 24, as shown in FIG. 4B. This electronic lock 25 prevents a telephone signal from reaching the input of the dispenser decoder 24 until the lock 25 has been opened. A Teletronix EC100, which has been successfully utilized in one embodiment, or similar device accepts an appropriate tone or pulse transmitted via the audio line 12 by an operator at the operations center 10 to actuate to an "open" position and allow a second telephone signal to reach the input of the dispenser decoder 24. The Teletronix Model EC100 is described in a brochure distributed by Teletronix Systems Incorporated, 3255 Kerner Blvd., Suite 6, San Rafael, California 94901, the disclosure of which is hereby incorporated by reference.

An operator at the operations center 10, by transmitting an appropriate tone or pulse to the electronic lock 25, can cause the lock 25 to be actuated and the connection between the audio communication line 12 and the dispenser decoder 24 to be made. The electronic lock 25 has a time-out feature which allows the lock 25 to remain open for a selected limited time. For example, the lock 25 may be designed to time-out in five seconds and, after being actuated by the operator at the operations center 10, the operator has five seconds to transmit an appropriate tone or pulse combination to the dispenser decoder 24 to effect an actuation of a dispenser solenoid 41 and associated bin 23. Should an appropriate signal not be transmitted during that five-second interval, the electronic lock 25 will once again open the circuit between the audio communication line 12 and dispenser decoder 24. Should that happen, the operator at the operations center 10 must again send the appropriate signal to the lock 25 to once again gain access to the dispenser decoder 24.

As shown in FIG. 3 and as discussed above, a verification module 26 is located in the remote transaction booth 11 and is used for receiving an identification card or other identification means and for providing a video image of the card or other means to an operator at the operations center 10. The verification module 26 may be conveniently located beside the seating area 15 in the booth 11, much as an armrest would be positioned. Alternatively, the verification module 26 may be positioned anywhere in the booth 11 readily accessible by a user. The module 26 includes a holder 28 for receiving and securing an identification card or other identifying means in place. A camera or similar video device 27, as discussed above, is located in the module 26 and is oriented to focus on a card or other document placed in the holder 28. The camera 27 output is selectively transmitted to the video phone 18 by means of the video switcher 39.

The video switcher 39 alternatively provides connection of the first and second cameras, 38 and 27, to the video phone 18 for transmission to the operations center 10 via the external video communication line 13. The video signal transmitted from the remote transaction booth 11 to the operations center 10 via the video communication line 13 will alternatively be that from the communication module camera 38 and the verification module camera 27. Accordingly, the video image transmitted along the external video communication line 13 is that image which is recorded by the security recorder 19. As will be recognized by those skilled in the art, multiple external video communication lines, each having their own modulating and interfacing equipment, may be employed and the video switcher 39 may be eliminated. In such an arrangement, the operator at the operations center 10 will have multiple images available and recording of selected video images and audio may be accomplished at the operations center 10.

As mentioned above, the video phone 18 may transmit and receive images via ordinary telephone lines. Alternatively, coaxial lines, fiberoptic lines, microwave transmission, or other high-speed data transmission paths may be used and "fast scan", or moving, pictures may be transmitted and received by the video phone 18. Presently, ordinary telephone lines are used to transmit and receive still images.

In the various modules, all equipment requiring input from or output to equipment or communication lines external to that module is wired to electrical connection plugs. A wiring harness 29, such as commonly used in electrical applications, having electrical connection plugs which are complementary to the connection plugs on the various modules, is used to interconnect the communication module 16, the verification module 26, the dispenser module 22, the payment submodule 21 (if separate), and the external audio 12 and video 13 communication lines. The use of the wiring harness 29 facilitates the assembly, replacement and maintenance of the remote transaction booth 11. Testing of the individual modules and equipment contained therein is provided by the unplugging of the wiring harness 29 from that particular module and the plugging-in of appropriate test equipment.

Operation of the remote transaction booth.

In accordance with the present invention, the operations center 10 will be interconnected to the remote transaction booth 11 location upon customer request. This is accomplished by the customer's pressing the momentary push-button switch 31. Actuation of the switch 31 applies AC voltage to the control relay 32. This relay 32 energizes the equipment located in the booth 11 with 120 volt AC power and latches itself in the actuated position. The control relay 32 also activates the speaker phone 34 call button to initiate an off-hook condition.

Telephone company central office equipment acknowledges the off-hook condition with the return of a dial tone, as is standard. Upon receipt of the dial tone, the automatic dialer 36 commences dialing the preprogrammed number to the operations center 10. The public switched telephone network routes the call to the location dialed as with any ordinary phone call. Upon answering at the operations center 10, the control operator will ascertain the nature of the customer's requirement verbally with the customer's dialogue taking place through the hands-free speaker phone 34 or the handset 17.

At this point in the transaction, the remote-originating audio line 12 is used for dual purposes: first, to verbally communicate with the customer, and second, to remotely control the decoders 20 and 24 at the remote transaction booth 11. In order to provide security from monitoring touch tone messages and to eliminate the sound nuisance to customers, the video sequencing decoder 20 also controls the telephone speaker phone 34 by turning it off and on in a well known manner. When it is necessary to transmit tone instructions to the remote decoders 20 and 24, a speaker OFF command is sent first, followed by the desired code sequence, followed by a speaker ON command. In this manner, momentary muting of the speaker phone 34 is provided during periods of control signal transmission.

To establish video communication between the operations center 10 and the remote booth 11, the control operator places a call to the remote booth 11 on a second external communication line 13 which is answered by the video phone 18. The PHOTOPHONE as normally manufactured requires instruction through the keypad or diode matrix 37 to answer incoming calls. An instruction may be sent via the audio line 12 to the decoder 24 to instruct the video phone 18 to answer the incoming call. Alternatively, the software used to control the phone 18 may be altered so the phone 18 will automatically answer the call initiated by the remote operator. The software alteration is well within the skill of one familiar with such phones and has been done by and is available from Image Data Corporation, the manufacturer of the PHOTOPHONE used in one embodiment of the present invention.

The operator may send any desired video over the second communication line 13 to be displayed on the video phone 18. A touch tone command sequence is sent by the operator over the audio communication line 12 to the video sequencing decoder 20 which, in conjunction with the diode matrix 37, causes the video phone 18 to begin sending video images from the booth 11 to the operations center 10. The first camera unit 38 of the video phone 18 is mounted directly in front of the customer and will capture pictures of any activity in the booth 11 where the customer would normally sit.

A second camera unit 27, located in the verification module 26 is used to capture pictures of the customer's identification. Typical identification might include a driver's license or passport. In one embodiment of the present invention, the verification module 26 serves as an armrest in the booth 11. A small sliding or hinging door is used for placement of the identification. When the identification is positioned in the armrest and the door is closed, the camera unit 27 in the module 26 is ready to transmit a video image of the identification to the operations center 10.

The video switcher 39, which is controlled by the operator at the operations center 10 through appropriate touch tone or pulse signals, is used to switch the video phone 18 input from the communication module camera 38 to the verification module camera 27 and back again.

The video switcher 39 also has a connection which is used for video input to the security recorder 19. A separate recorder input is connected to the audio communication line 12 for recording audio signals therefrom. The RCA time lapse video recorder used in one embodiment of the present invention also provides a date and time mask so that date and time information is recorded simultaneously with the video and audio. Control of the recorder is accomplished from the operations center 10 by means of tones transmitted via the audio line 12 to the decoder 20.

After positively identifying the customer, provision is made for credit approval. A credit card reader 40 is provided to read the data encoded on the magnetic strip of the card. Additionally, a keypad may be provided for the use of bank cards requiring the input of a personal identification number to activate the card.

Once the transaction has been approved by the operator at the operations center 10 and payment has been arranged, the dispenser 22 may be actuated from the operations center 10 to dispense selected items or objects to the customer. The operator transmits an appropriate telephone touch tone or pulse combination to the electronic lock 25. In response to that signal, the electronic lock 25 in the dispenser module 22 opens and provides access to the dispenser decoder 24 by the operator at the operations center 10. The operator can then address the dispenser decoder 24 using appropriate touch tone or pulse combinations to actuate selected bins 23 in the dispenser module 22.

Once the transaction has been concluded, the operator at the operations center 10 may terminate the video phone connection and momentarily interrupt the latch-in circuit on the control relay 32. These functions are accomplished by transmitting touch tone or pulse signals via the audio communication line 12 to the video sequencing decoder 20. The decoder 20, in turn, generates control signals for the diode matrix 37 in the video phone 18, causing the video phone 18 to terminate its connection to the external video communication line 13, and to a disconnection relay 43 which, when activated, causes a contact 44 in the control relay latch-in circuit to open. When the disconnection relay contact 44 breaks the control relay latch-in circuit, the control relay 32 drops out, removing 120 volt AC power from all equipment in the booth 11. The telephone speaker phone 34 is also caused to be placed in an on-hook state which allows the telephone company central office equipment to terminate the call.

It will now be recognized that a new and useful remote transaction booth has been provided for conducting business transactions wherein visual contact between a buyer and seller is desired or required. Although the above description describes details of a preferred embodiment of the present invention, it will be understood by those skilled in the art that numerous other embodiments and applications of the invention may exist or be developed. Although in many such applications all of the advantages of the illustrated embodiment may not be achieved, certain desirable attributes may be attainable. The scope of the present invention should accordingly be limited only by the scope of the appended claims.

What is claimed is:

1. A business transaction system, comprising:
    an operations center;
    a transaction booth located remote from said operations center;
    said transaction booth including
        an audio device to transmit and receive audio signals between said transaction booth and said operations center;
        a first video device to transmit and receive video images between said transaction booth and said operations center;
        a second video device to transmit images from said transaction booth to said operations center for purposes of visual verification of identification documents;
        a decoder connected to said audio device and said first video device, said decoder connected to receive signals from said operations center and responsive to said signals to control said audio device and said first video device; and
        a dispenser coupled to said decoder for dispensing items to a user in response to control by said decoder;
    audio and video communication lines extending between said operations center and said transaction booth for conveying signals between said operation center and said transaction booth;

said transaction booth further including a switching device for selectively coupling said first and second video devices to said video communication line.

2. The system of claim 1, wherein said switching device is connected to receive control signals from said operations center through said audio communication line and responsive to said control signals to selectively couple said video devices to said video communication line in response thereto.

3. A remote transaction booth, comprising:
a booth housing;
a communication module contained in said housing, said module having:
    an audio device for connection to a first external communication line for providing audio communication with a remote location;
    a video device for connection to a second external communication line for providing video images from said transaction booth to a remote location;
    a security recorder for recording said audio communication and said video images;
    a first decoder having an input coupled to said first external line, and said decoder having outputs coupled to said audio device, said video device and said recorder, said decoder being adapted to receive pulses transmitted along said first external line and to control said audio device, said video device and said recorder in response thereto;
a dispenser module, having:
    a plurality of bins for storing items to be selectively dispensed to a user of said transaction booth;
    a second decoder having an input coupled to said first external line and responsive to signals transmitted over said first external line to control said bins to selectively dispense said items; and
    a lock interposed between said first external line and said second decoder for preventing inadvertent dispensing of said items.

4. The transaction booth of claim 3, wherein said video device is a first video device, said transaction booth further comprising:
a verification module, having:
    a holder for receiving and securing an identification document; and
    a second video device for connection to said second external line for providing video images of said identification document to said remote location.

5. The transaction booth of claim 4, wherein said communication module further comprises:
a video switcher connected intermediate said first and second video devices and said second external communication line and operative to alternatively couple said first and second video devices to said second external communication line.

6. The transaction booth of claim 3, further comprising:
a payment module having:
    a credit card receiver,
    detector means for extracting information from said credit card, and
    transfer means for transferring said information from said transaction booth to said remote location.

7. The transaction booth of claim 3, wherein:
said modules may be installed in and removed from said housing, said modules having plug-in connections for connection to a wiring harness.

8. A remote transaction booth for dispensing keys for renting automobiles, comprising:
audio communication equipment for establishing audio communication between a person in said transaction booth and an operator at a location remote from said transaction booth;
video communication equipment for establishing video communication between said transaction booth and said location remote from said transaction booth, said video equipment including:
    a plurality of cameras, at least one camera positioned to receive an image of said person and at least one camera positioned to receive an image of selected identification;
    a camera selector switch for selecting one of said images for transmission from said transaction booth to said remote location;
    a recorder for recording said transmitted image and said audio communication;
payment means for receiving a credit card for payment of said rental;
dispensing means for dispensing automobile keys to said person, said dispenser including a security lock for preventing inadvertent dispensing of keys;
a decoder connected to said audio and video equipment and to said dispensing means, said decoder oriented to receive signals from said operator at said location remote from said transaction booth and adapted to control said video equipment and said dispensing means.

* * * * *